Dec. 27, 1938.  G. W. EMRICK  2,141,209
TAPPING ATTACHMENT
Filed Aug. 12, 1937
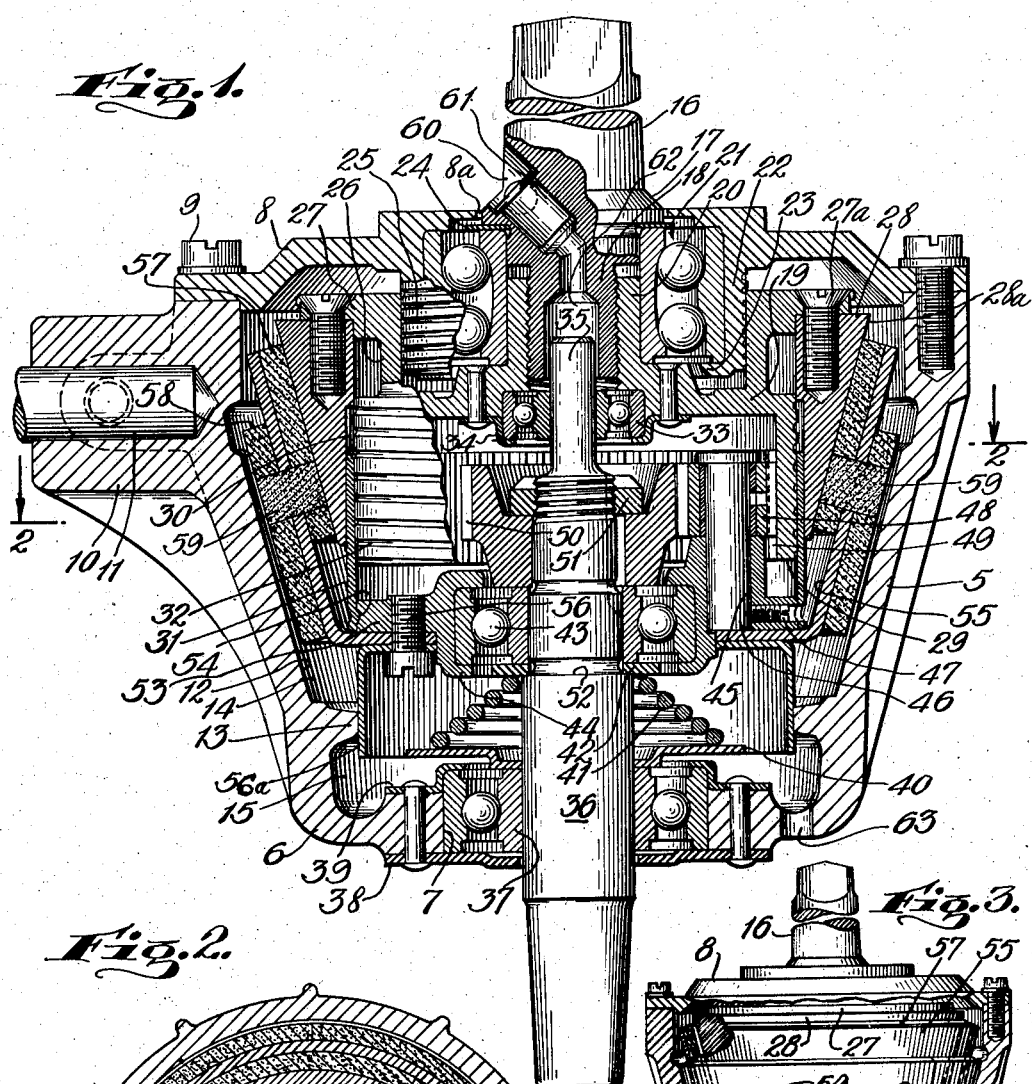
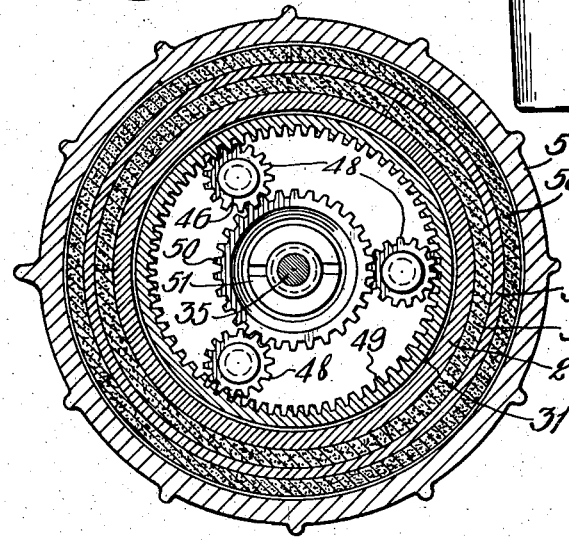
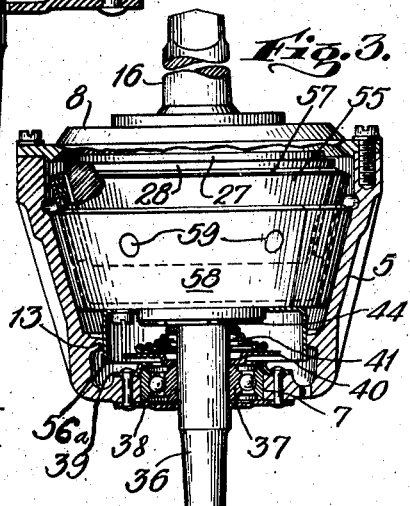
INVENTOR
GEORGE W. EMRICK
BY
Howard E. Thompson
ATTORNEY Patented Dec. 27, 1938

2,141,209

UNITED STATES PATENT OFFICE 2,141,209

TAPPING ATTACHMENT

George W. Emrick, Brooklyn, N. Y.

Application August 12, 1937, Serial No. 158,730

15 Claims. (Cl. 74—298)

This invention relates to tapping attachments and particularly to devices of this kind designed for high speed drive of a tap and wherein the gear mechanism of the tap remains idle in the driving or tapping operation of the attachment, and is only put into operation in the reverse drive of the tap in removing the same from the work piece, and the object of the invention is to provide an attachment of the class described consisting of a substantially conical or cup-shaped casing within which all of the operative parts of the attachment are arranged, and wherein one tapered wall of the casing forms part of the cone clutch mechanism of the attachment upon which the conical clutch is adapted to seat in the reverse drive of the attachment; a further object being to provide a large cover controlling the upper open end of the casing of the attachment and in the formation of a bearing portion in said cover with a guide sleeve thereon in connection with which the drive member of the clutch rotates; a further object being to provide a depending skirt on said drive member inwardly of the conical clutch portion thereof and spaced from the inner surface of said clutch portion or ring by an annular chamber within and between which is a slinger sleeve or cylinder to maintain the lubricants within the central portion of the attachment and to prevent transmission thereof onto the fibre facings of the conical clutch; a further object being to provide an attachment wherein the drive spindle and the driven spindle or shaft are both mounted in ball bearings in the attachment to provide free rotation thereof, the driven shaft having a series of ball bearing mountings in the case, cone, and drive member of the attachment, and with these and other objects in view, the invention consists in an attachment of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal sectional view through an attachment made according to my invention with parts of the construction being shown in full lines.

Fig. 2 is a partial section on the line 2—2 of Fig. 1, and

Fig. 3 is a sectional view of the attachment showing the conical clutch mechanism in full lines except for a small portion thereof.

In practice I provide a casing 5 which is substantially conical or cup-shaped in form. The bottom wall 6 of the casing has a large opening 7 therein, whereas the top of the casing is open and adapted to be closed by a cover or closure plate 8 secured to the casing by screws 9. At one side of the upper portion of the casing is a projecting lug 10 in which the usual stop rod 11 is mounted. Centrally of the casing 5 is formed a conical brake seat 12, at the base of which is an upwardly extending annular flange 13 which, by virtue of the structure later described, divides the casing into upper and lower chambers 14 and 15 respectively.

At 16 I have shown a part of the drive spindle for mounting the attachment in connection with a tapping or other suitable machine. The spindle is of the conventional tapered type and provided with an enlarged collar 17 at the end portion thereof, below which is a reduced externally threaded tubular portion 18, in connection with which a cup-shaped internal gear 19 is mounted. The gear has an upwardly projecting threaded part 20 engaging the portion 17 and forming a support for a double race ball bearing which also seats in a sleeve portion 22 of the cover 8. The bearing 21 is held in position within the sleeve 22 of the cover by spinning or turning the lower end of the sleeve 22 as indicated at 23. The central portion of the cap 8 has an aperture 8a to receive the spindle 16 or the flange 17 thereof, and between said flange and the bearing 21 is a seal washer 24 which will prevent the escape of lubricant through the top of the device.

The sleeve portion 22 of the cover 8 is provided with longitudinally spaced oil grooves 25 on the outer surface thereof which operate to form a seal between said sleeve and the upwardly extending tubular portion 26 of the gear 19, and also to permit free movement of the gear longitudinally of the sleeve as will be apparent. The tubular portion 26 terminates at its upper end in an outwardly projecting circumferential flange 27 which is grooved on its lower surface to receive the forward drive cone 28, secured in position by screws 27a. The inner straight bore of the cone 28 is arranged in spaced relation to the outer surface of the sleeve portion 29 of the internal gear 19 so as to form a narrow annular passage 30 between said surfaces in which an oil gland 31 is free to move. The gland is in the form of a sleeve as will be seen, and circumferential oil grooves 32 are formed on the outer surface of the tubular portion 29 to lubricate the gland as well as to effect a seal preventing discharge of the lubricant externally of the gland.

The base of the tubular portion 20 of the gear 19 is recessed to receive a ball bearing 33 held in place by a retaining ring 34 riveted or otherwise secured to said gear. The bearing 33 forms a support and guide for the upper reduced end 35 of the driven spindle or shaft 36. The shaft 36 is arranged centrally of the casing 5 and is mounted in a ball bearing 37 supported in the aperture 7 of the casing and held in place by rings 38 and 39 secured to the bottom wall of the casing.

Arranged upon the upper surface of the inner race of the bearing 37 is a spring thrust washer 40 in connection with which a conical spring 41 seats. The upper end of the spring engages another thrust collar 42 seating upon the inner race of a loose ball bearing 43 supported centrally of a spider gear carrier 44, having three upwardly extending bearing portions 45 in which are mounted studs 46 secured in position by screws 47 in the manner indicated at the right of Fig. 1, in which figure only one of the three units is shown. The other pinion gear units are illustrated in Fig. 2 of the drawing.

On the studs 46 are arranged pinion gears 48 which mesh with the internal gear face 49 of the gear 19, and also with a gear 50 keyed to the driven shaft 36 above the bearing 43. The gear 50 as well as the bearing 43 is held in position on the shaft 36 by a nut 51 in the manner clearly illustrated in Fig. 1, it being noted that the washer 42 seats upon a shoulder 52 on said shaft.

The carrier 44 has an outwardly extending annular flange portion 53, the outer surface of which is grooved externally to receive an inwardly pressed portion on the sleeve 31 to retain said sleeve as a permanent part of said carrier as indicated at 54. The flange 53 also provides means for supporting the conical clutch shell 55 by means of screws 56, one of which is illustrated in Fig. 1 of the drawing. These screws also support a cup-shaped oil slinger 56a in connection with the flange 53, which slinger or housing fits with slight clearance in the inwardly extending flange 13, and is free to rotate and move radially therein.

Mounted upon the inner and outer surfaces of the clutch sleeve 55 are leather or clutch facings 57 and 58 respectively, which are preferably cemented in position and also reinforced by leather dowels 59 which pass through the cone sleeve 55 and are spaced circumferentially thereof, with the outer ends of said dowels flush with the inner and outer surfaces of the facings 57 and 58 respectively. The cone sleeve 55 in conjunction with the facings 57 and 58 forms the clutch and brake unit which is movable into and out of engagement with the conical surface 12 of the casing 5 and the surface 28a of the forward drive cone 28. The clutch is shown in its forward drive position or engagement in Fig. 1 of the drawing, and in the reverse drive position in Fig. 3 of the drawing.

The spindle 16 is provided adjacent the flange 17 thereof with an oil admission aperture 60 in which is disposed a ball check valve 61. The aperture 60 opens into the bore 62 of the tubular extension 18 so that lubricating oil may pass downwardly into the attachment to lubricate the bearings 43 and the bearing 37 as well as to lubricate the gears 48, 49, and 50. It is understood that the gears as well as the ball bearings may also be lubricated with conventional greases which is also applicable to the bearing 21. The bottom of the casing 5 is provided with a discharge opening 63 through which excess lubricating oil may pass should an excess of oil prevail at any time.

It will be understood that the conical sleeve 55 and its associated parts in conjunction with the parts 31, 57 are free to rotate on the bearing 43. When the parts are in the position shown in Fig. 3, the internal gear 19, including the forward drive cone 28 is also free to rotate on the bearings 21 and 33 in which position of the parts, the cone 55 is held stationary in the casing 5 by engagement of the facing 58 with the surface 12. The planetary gearing will then be in operation to cause the shaft 36 to be rotated in a direction opposite to the direction of rotation of the internal gear 49, which will drive the shaft 36 through the gear 49, pinions 48, and gear 50, which constitutes the reverse drive of the shaft 36 in withdrawing a tap from a work piece as will be readily understood. In the other forward drive positions of the parts as seen in Fig. 1 of the drawing, the planetary gearing acts as a keying means to form a complete rotating or operating unit of the shaft 36, the clutch sleeve 55 and cone 28, including the other associated parts which unit operates in the bearings 21 and 37. In other words, in the driving position of the device as seen in Fig. 1 for actuating the tap to tap a hole in a work piece, the gears 48, 49, and 50 do not move relatively to each other but all rotate as a locked planetary gearing around the axis of the spindle 16.

In the operation of the attachment, the parts 31 and 57 serve to house or encase the lubricants within the central portion of the attachment and prevent escape of the lubricant onto the surfaces of the conical clutch employed. It will also appear that the spring 41 serves to normally support the parts in the position shown in Fig. 1, even when the attachment is operating idly.

It will be understood that ball bearings may be had of the tight fitting kind and also of varying degrees of looseness. The bearing 43 will have sufficient play therein to permit radial movement of the sleeve 55 on the shaft 36 so that the clutch sleeve 55 will be self-seating upon the surfaces 28a and 12 to care for any irregularities that may prevail on the leather facings 57, 58. It will also be understood that a tapping attachment of the character described will be substantially noiseless in operation especially during the period of driving the tap in making a thread, due to the fact that the planetary gearing is not then in operation.

It will also appear that the required slippage will be provided by virtue of the fibrous or leather facings employed on the conical clutch sleeve 55 engaging the facings 12, 28a. Further, it will be apparent that sufficient clearance will be provided between the members 31—57 and their associated parts to provide for the radial or rocking movement of the sleeve 55 upon its loose bearing 43, it being understood that these movements are slight and simple enough to compensate for slight irregularities that may prevail as heretofore stated.

By virtue of the construction employed, my attachment will have long life, notwithstanding the high speed operation thereof. Whenever desired, repairs and replacements may be made by removing the entire unit from the casing by simply removing the screws 9, and the parts 36, 55, and associated parts may be removed from the parts 19, 28 when detached from the casing. In other words, it will be apparent that the attachment consists of readily detachable units consisting of the casing 5 with the bearing 37 therein, the cover 8 with the bearing 21 therein, the gear 19 and associated parts together with the bearing 33 therein, and the clutch sleeve 55 and associated parts including the bearing 43. It will of course be understood that the unit 19 will normally constitute a part of the cover unit 8 when the spindle 16 is attached, but will separate therefrom when said spindle is removed.

Having fully described my invention, what I claim as new and desire to secure by Lettters Patent, is:

1. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, and drive spindle directly coupled with said forward drive cone and a driven shaft rotatably supported by anti-frictional bearings at spaced intervals in said drive spindle, clutch sleeve and casing, and means involving a planetary gearing arranged within the forward drive cone and said clutch sleeve for producing forward and reverse drives of the driven shaft by said drive spindle.

2. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, and tensional means for normally supporting the clutch sleeve in engagement with said cone.

3. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, and an oil gland on said sleeve and cooperating with said cone to form a housing for the lubricants for said planetary gearing.

4. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, an oil gland on said sleeve and cooperating with said cone to form a housing for the lubricants for said planetary gearing, and other means for housing the lubricants at the lower portion of said casing.

5. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, an oil gland on said sleeve and cooperating with said cone to form a housing for the lubricants for said planetary gearing, and a free anti-frictional bearing for said clutch sleeve on the driven shaft, to provide self-seating of said sleeve.

6. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, an oil gland on said sleeve and cooperating with said cone to form a housing for the lubricants for said planetary gearing, an anti-frictional bearing for said clutch sleeve on the driven shaft, and an anti-frictional bearing for the cone on said driven shaft.

7. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, an oil gland on said sleeve and cooperating with said cone to form a housing for the lubricants for said planetary gearing, an anti-frictional bearing for said clutch sleeve on the driven shaft, an anti-frictional bearing for the cone on said driven shaft, and said drive spindle and driven shaft having anti-frictional mountings in the cover and casing respectively.

8. A tapping attachment comprising a cup-shaped casing open at the top substantially to the extent of the entire diameter of the casing, a cover for closing the open end of the casing, a forward drive friction clutch and reverse drive brake mechanism arranged in said casing and within the cover therefor, said mechanism comprising a forward drive cone, a conical brake seat formed in the bore of said casing, a conical clutch and brake sleeve disposed between said cone and seat, a drive spindle directly coupled with said forward drive cone and a driven shaft rotatably supported in said clutch sleeve and casing, means involving a planetary gearing arranged within the forward drive cone and said clutch sleeve for producing forward and reverse drives of the driven shaft by said drive spindle, said planetary gearing comprising an internal gear rotatable with said cone, a gear keyed to said driven shaft, a plurality of pinions disposed intermediate and meshing with said first named gears and supported on and movable with said clutch and brake sleeve, an oil gland on said sleeve and cooperating with said cone to form a housing for the lubricants for said planetary gearing, an anti-frictional bearing for said clutch sleeve on the driven shaft, an anti-frictional bearing for the cone on said driven shaft, said drive spindle and driven shaft having anti-frictional mountings in the cover and casing respectively, and means for admitting lubricants into the planetary gearing through said spindle.

9. A tapping attachment of the class described comprising a cup-shaped casing having a conical brake seat in the bore thereof, a drive spindle projecting through one end of the casing, a forward drive cone coupled with said spindle, a friction clutch and brake element freely rotatable in the casing and movable into engagement with said cone and the seat in said casing in the forward and reverse drives of the attachment, a driven shaft freely rotatable in anti-friction bearings in said drive spindle, clutch element and casing and projecting through the other end of said casing, and means involving a planetary gearing between said driven shaft and cone for controlling the forward and reverse drive of said driven shaft.

10. A tapping attachment of the class described comprising a cup-shaped casing having a conical brake seat in the bore thereof, a drive spindle projecting through one end of the casing, a forward drive cone coupled with said spindle, a friction clutch and brake element freely rotatable in the casing and movable into engagement with said cone and the seat in said casing in the forward and reverse drives of the attachment, a driven shaft freely rotatable in said drive spindle, clutch element and casing and projecting through the other end of said casing, means involving a planetary gearing between said driven shaft and cone for controlling the forward and reverse drive of said driven shaft, means whereby the planetary gearing remains idle when the clutch element is in operative engagement with said cone in the forward drive of said driven shaft, said cone including an internal gear portion arranged in spaced relation to a part of said cone to form an annular restricted chamber therebetween, and an oil sealing sleeve arranged in said chamber and housing lubricating oil within and in spaced relation to said clutch element.

11. A tapping attachment of the class described comprising a cup-shaped casing having a conical brake seat in the bore thereof, a drive spindle projecting through one end of the casing, a forward drive cone coupled with said spindle, a friction clutch and brake element freely rotatable in the casing and movable into engagement with said cone and the seat in said casing in the forward and reverse drives of the attachment, a driven shaft freely rotatable in said drive spindle, clutch element and casing and projecting through the other end of said casing, means involving a planetary gearing between said driven shaft and cone for controlling the forward and reverse drive of said driven shaft, means whereby the planetary gearing remains idle when the clutch element is in operative engagement with said cone in the forward drive of said driven shaft, said cone including an internal gear portion arranged in spaced relation to a part of said cone to form an annular restricted chamber therebetween, an oil sealing sleeve arranged in said chamber and housing lubricating oil within and in spaced relation to said clutch element, and said sleeve being supported on and movable with said clutch element.

12. A tapping attachment of the class described comprising a cup-shaped casing having a conical brake seat in the bore thereof, a drive spindle projecting through one end of the casing, a forward drive cone coupled with said spindle, a friction clutch and brake element freely rotatable in the casing and movable into engagement with said cone and the seat in said casing in the forward and reverse drives of the attachment, a driven shaft freely rotatable in said drive spindle, clutch element and casing and projecting through the other end of said casing, means involving a planetary gearing between said driven shaft and cone for controlling the forward and reverse drive of said driven shaft, means whereby the planetary gearing remains idle when the clutch element is in operative engagement with said cone in the forward drive of said driven shaft, said cone including an internal gear portion arranged in spaced relation to a part of said cone to form an annular restricted chamber therebetween, an oil sealing sleeve arranged in said chamber and housing lubricating oil within and in spaced relation to said clutch element, said sleeve being supported on and movable with said clutch element, and another oil housing sleeve on said element extending into the lower portion of the casing to house the oil therein.

13. A device of the class described consisting of three detachably coupled units, one unit comprising a cup-shaped casing having a conical brake surface and an anti-frictional bearing in the lower end of said casing, another of said units comprising a cover for closing the upper open end of the casing, said cover unit including a drive spindle having a ball bearing mounting in the cover and a drive cone including an internal gear portion, said cone being disposed in spaced relation to the conical brake surface of said casing, the third unit comprising a conical clutch and brake sleeve disposed between said cone and said conical brake surface, said last named unit including a drive shaft having a ball bearing mounting in said clutch sleeve and a gearing on said shaft and in operative engagement with the internal gear of said cover unit, and all of said units being detachable one with respect to the other.

14. In a tapping attachment of the class described, a drive shaft extending into the attachment, a drive cone in said attachment in operative engagement with said shaft, a driven shaft in said attachment and projecting therefrom, a conical clutch sleeve arranged to engage said drive cone, and a loose ball bearing for mounting the conical clutch sleeve on said driven shaft to provide free radial movement of said sleeve on said driven shaft whereby said sleeve will be self-seating on said drive cone.

15. In a device of the class described employing a conical friction clutch and brake means for coupling the drive spindle of a device with the driven shaft thereof, means involving a planetary gearing arranged and housed within said first named means for placing the drive spindle in operative engagement with the driven shaft, said first named means comprising a cone fixed to and rotatable with said spindle, a stationary conical brake seat, a double-faced clutch and brake sleeve disposed between and movable into engagement with said cone and seat in the forward and reverse drives of the driven shaft, means resiliently holding the sleeve normally in engagement with said cone, and a free anti-frictional bearing for the clutch sleeve on said driven shaft to provide self-seating of said sleeve.

GEORGE W. EMRICK.